United States Patent
Su et al.

(10) Patent No.: US 6,791,928 B2
(45) Date of Patent: Sep. 14, 2004

(54) METHOD FOR FORMATTING OPTIC DISK WITHOUT COMPUTER

(75) Inventors: Steel Su, Taipei (TW); Toon Jeow Foo, Singapore (SG)

(73) Assignee: Behavior Tech Computer Corporation, Taipei (TW)

( * ) Notice: Subject to any disclaimer, the term of this patent is extended or adjusted under 35 U.S.C. 154(b) by 398 days.

(21) Appl. No.: 10/096,825

(22) Filed: Mar. 14, 2002

(65) Prior Publication Data

US 2003/0174613 A1 Sep. 18, 2003

(51) Int. Cl.$^7$ .................................................. G11B 7/00
(52) U.S. Cl. ........................ 369/59.25; 369/47.55; 369/53.1; 369/47.1
(58) Field of Search ......................... 369/47.1, 47.15, 369/47.21, 47.27, 47.28, 47.3, 47.39, 47.46, 47.55, 53.1, 53.11, 53.2, 53.21, 53.37, 53.41, 53.45, 59.1, 59.14, 59.25, 275.3

(56) References Cited

U.S. PATENT DOCUMENTS 6,172,955 B1 * 1/2001 Hashimoto ............... 369/53.37
6,631,468 B1 * 10/2003 von Below ................... 713/2
6,741,799 B2 * 5/2004 Ando et al. .................. 386/95

* cited by examiner

Primary Examiner—Muhammad Edun
(74) Attorney, Agent, or Firm—Rosenberg, Klein & Lee

(57) ABSTRACT

A method for formatting an optic disk by an optic disk drive is disclosed. The optic disk drive includes a control unit having operation keys. The method includes the steps of (a) initiating a formatting operation; (b) setting the optic disk drive to a busy condition; (c) checking if the optic disk is a blank CD-RW disk and going to step (g) if the optic disk is a blank CD-RW disk otherwise going to step (d); (d) checking if the optic disk is a UDF disk and issuing a warning and ending the operation if the optic disk is not a UDF disk otherwise going to step (e); (e) performing a quick formatting operation and writing label in UDF file system of the formatted optic disk; (f) Ending the formatting operation; (g) performing a complete formatting operation and writing label in the UDF file system of the formatted optic disk; and (h) ending the formatting operation. No computer is needed in performing the optic disk formatting operation.

1 Claim, 2 Drawing Sheets

METHOD FOR FORMATTING OPTIC DISK WITHOUT COMPUTER

BACKGROUND OF THE INVENTION

1. Field of the Invention

The present invention generally relates to the field of optic disk drive, and in particular to a method for directly formatting an optic disk without a computer system.

2. The Related Art

In writing data into an optic disk by a rewriteable optic disk drive, the disk must be properly formatted in advance. Heretofore, the formatting operation of optic disks is performed under the control of a computer system. This causes problems. For example, an optic disk cannot be formatted in the absence of a computer system.

Thus, the present invention is aimed to solve the above problem by providing a method and device for formatting an optic disk without a computer system.

SUMMARY OF THE INVENTION

Accordingly, an object of the present invention is to provide a method for formatting an optic disk without a computer system.

Another object of the present invention is to provide an optic disk drive capable to perform a formatting operation on an optic disk without being controlled by a computer system.

To achieve the above objects, in accordance with the present invention, there is provided a method formatting an optic disk by an optic disk drive wherein the optic disk drive comprises a control unit having operation keys. The method comprises the steps of (a) initiating a formatting operation; (b) setting the optic disk drive to a busy condition; (c) checking if the optic disk is a blank CD-RW disk and going to step (g) if the optic disk is a blank CD-RW disk otherwise going to step (d); (d) checking if the optic disk is a UDF disk and issuing a warning and ending the operation if the optic disk is not a UDF disk otherwise going to step (e); (e) performing a quick formatting operation and writing label in UDF file system of the formatted optic disk; (f) Ending the formatting operation; (g) performing a complete formatting operation and writing label in the UDF file system of the formatted optic disk; and (h) ending the formatting operation. No computer is needed in performing the optic disk formatting operation.

BRIEF DESCRIPTION OF THE DRAWINGS

The present invention will be apparent to those skilled in the art by reading the following description of a best mode of the operation thereof, with reference to the attached drawings, in which.

BEST MODE FOR CARRYING OUT THE PRESENT INVENTION

Figure 1:
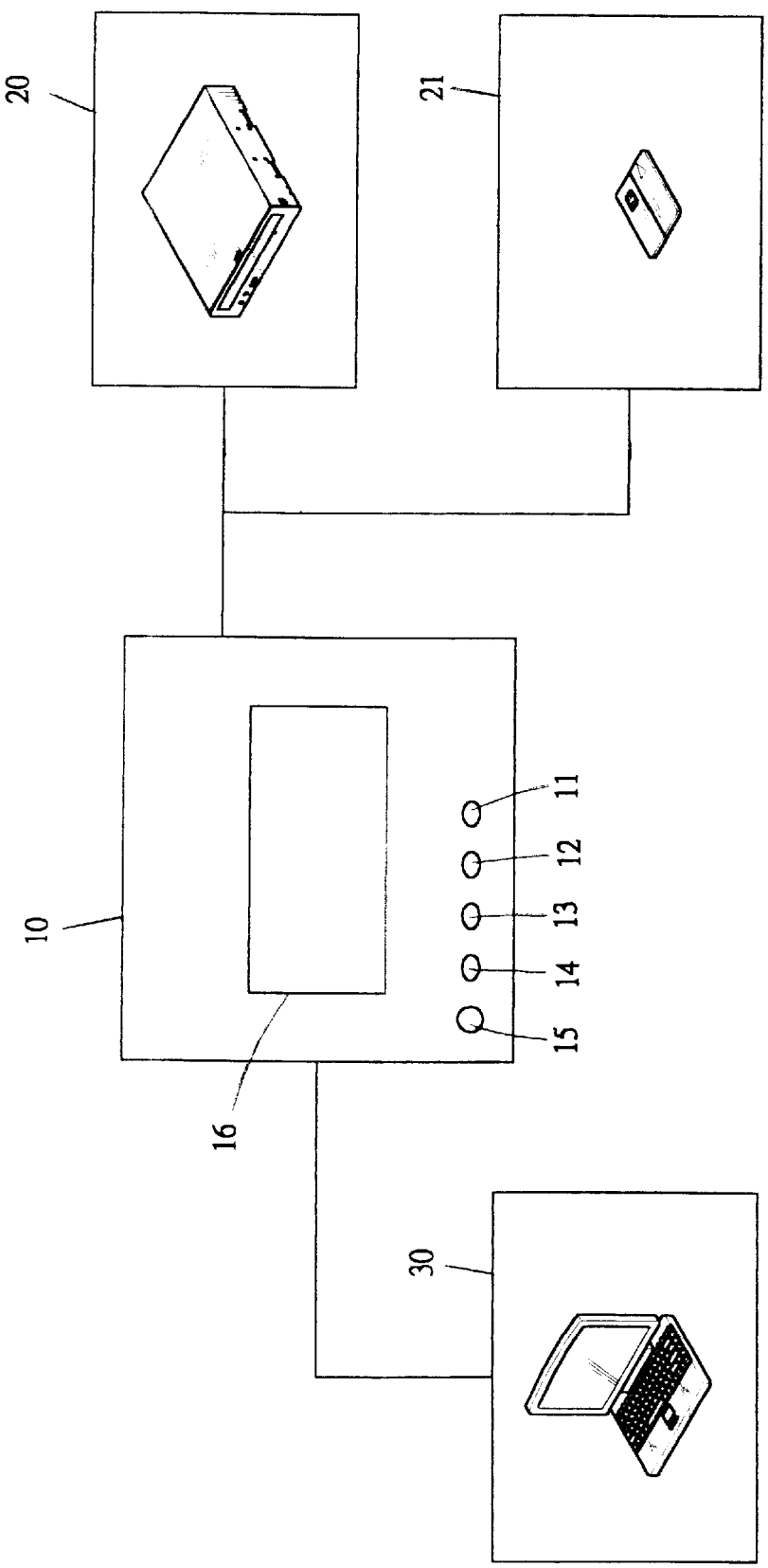
FIG. 1 is a schematic view of a system for performing a method of formatting an optic disk in accordance with the present invention.

With reference to the drawings and in particular to FIG. 1, a method for formatting an optic disk in accordance with the present invention is used in a rewriteable optic disk drive 20 for directly formatting an optic disk loaded in the optic disk drive 20 without a computer.

The method is preferably embodied in software form loaded in a control chip 16. The control chip 16 is arranged in a control unit 10. A number of operation keys, including a starting key 11, a writing key 12, a selection key 13 and a formatting key 14, and an operation indicator 15 are formed on the control unit 10 for user's control of the operation of the control unit 10. The starting key 11 is to power on the control unit 10 or to start the operation of the control unit 10. The writing key 12 is to start a writing operation of the optic disk drive 20 under the control of the control unit 10. The selection key 13 is to select among different writing modes. The formatting key 14 is to start a formatting operation of the optic disk by the optic disk drive 20. The indicator 15 indicates ending of the writing operation or the formatting operation.

Figure 2:
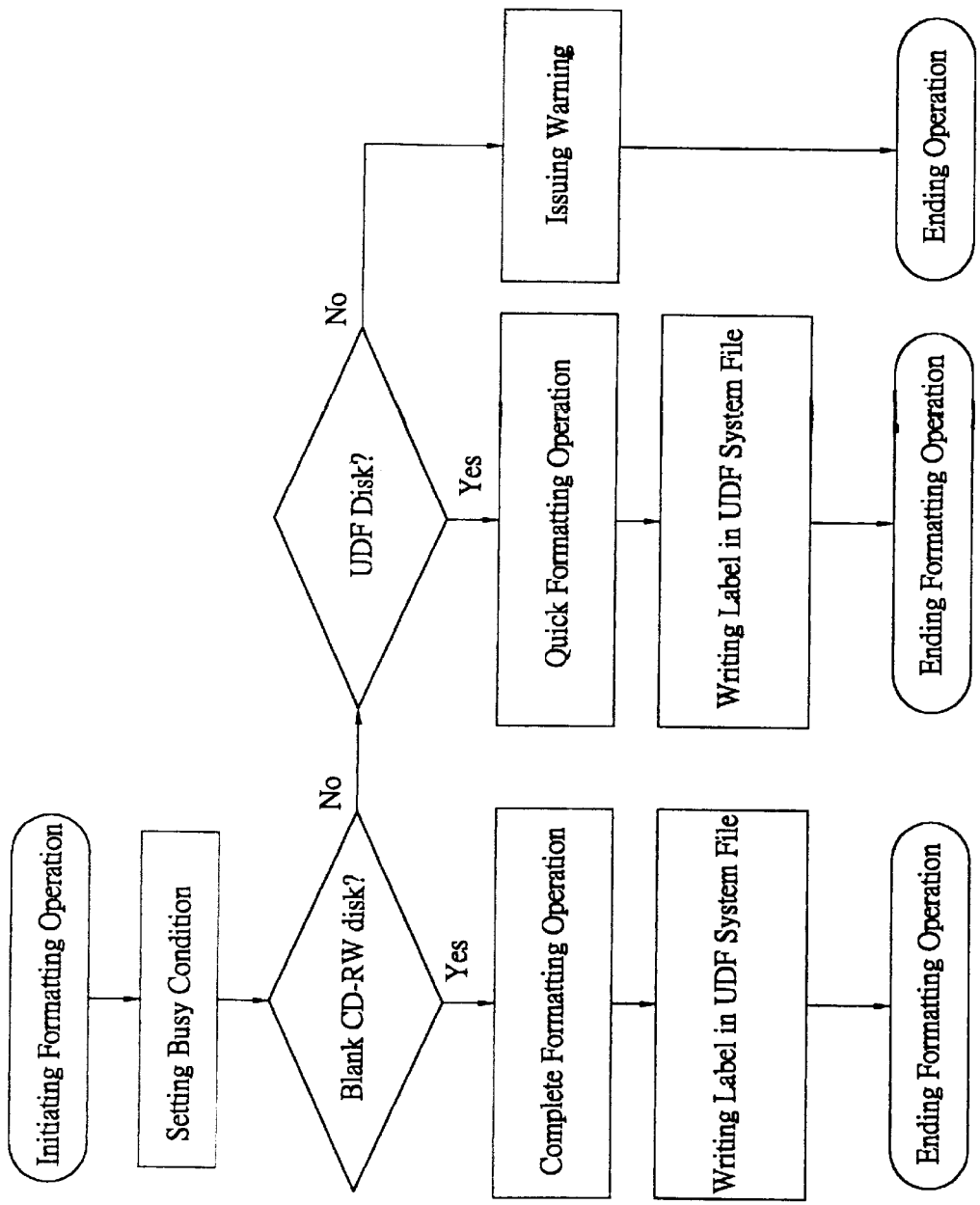
FIG. 2 is a flow chart of the method for formatting an optic disk in accordance with the present invention.

Also referring to FIG. 2, the operation of formatting an optic disk in accordance with the present invention is as follows:

(1) Actuating the starting key 11 to start the operation of the control unit 10;

(2) Setting the optic disk drive 20 to busy condition;

(3) Checking if an optic disk that is loaded in the optic disk drive 20 is a blank CD-RW disk and going to step (7) if it is, otherwise going to step (4);

(4) Checking if the optic disk is a UDF (Universal Disk Format) disk and issuing a warning and ending the operation if the optic disk is not a UDF disk otherwise going to step (5);

(5) Performing a quick formatting operation and writing label in UDF file system of the formatted optic disk;

(6) Ending the formatting operation;

(7) Performing a complete formatting operation on the optic disk and writing label in the UDF file system of the formatted optic disk; and (8) Ending the formatting operation;

(9) Ending the operation if the warning of step (4) is not properly fixed.

In accordance with the present invention, the above-discussed formatting operation can be initiated by the actuation of the formatting key 14. Alternatively, the control unit 10 can be designed to start the formatting operation by the actuation of the start key 11. In this respect, the start key 11 starts the operation of the control unit 11 as well as initiates the formatting operation. The writing key 12 allows data to be written into a formatted disk.

The control unit 10 can be connected to the optic disk drive 20 via a communication port, such as a USB (Universal Serial Bus) port. The formatting operation is initiated by the actuation of the keys of the control unit 10. Thus, a computer system is no longer needed in formatting an optic disk.

The control unit 10 can be combined with the optic disk drive 20. For example, the control chip 16 is integrated with the optic disk drive 20 and the keys formed on a casing of the optic disk drive. This simplifies the operation and allows the optic disk drive to be capable to format an optic disk all by itself without the assistance and control of a computer system. Alternatively, the control unit 10 can be connected to for example a notebook computer 30 as shown in FIG. 1 by means of for example a USB port to perform.

Although the present invention has been described with reference to the best mode thereof, it is apparent to those skilled in the art that a variety of modifications and changes may be made without departing from the scope of the present invention which is intended to be defined by the appended claims.

What is claimed is:

1. A method for formatting an optic disk by an optic disk drive, the optic disk drive comprising a control unit having operation keys, the method comprising the following steps:

(a) initiating a formatting operation;
(b) setting the optic disk drive to a busy condition;
(c) checking if the optic disk is a blank CD-RW disk and going to step (g) if the optic disk is a blank CD-RW disk otherwise going to step (d);
(d) checking if the optic disk is a UDF disk and issuing a warning and ending the operation if the optic disk is not a UDF disk otherwise going to step (e);
(e) performing a quick formatting operation and writing label in UDF file system of the formatted optic disk;
(f) Ending the formatting operation;
(g) performing a complete formatting operation and writing label in the UDF file system of the formatted optic disk; and
(h) ending the formatting operation.

\* \* \* \* \*